(12) United States Patent
Kim

(10) Patent No.: US 7,679,808 B2
(45) Date of Patent: Mar. 16, 2010

(54) PORTABLE ELECTRONIC DEVICE WITH AN INTEGRATED SWITCHABLE MIRROR

(75) Inventor: Nicole Jurie Kim, Potomac, MD (US)

(73) Assignee: Pantech & Curitel Communications, Inc., Seoul (KR)

( * ) Notice: Subject to any disclaimer, the term of this patent is extended or adjusted under 35 U.S.C. 154(b) by 842 days.

(21) Appl. No.: 11/306,939

(22) Filed: Jan. 17, 2006

(65) Prior Publication Data
US 2008/0186560 A1    Aug. 7, 2008

(51) Int. Cl.
*G02F 1/153*  (2006.01)
*G09F 13/04*  (2006.01)
(52) U.S. Cl. .................. 359/267; 359/275; 362/97.1
(58) Field of Classification Search ......... 359/265–275, 359/201.2, 439, 838, 839, 858, 863; 349/96, 349/114; 362/97.1, 97.2, 97.3, 97.4
See application file for complete search history.

(56) References Cited

U.S. PATENT DOCUMENTS

| | | | | |
|---|---|---|---|---|
| 6,437,900 | B1 * | 8/2002 | Cornelissen et al. | ........ 359/246 |
| 7,057,681 | B2 * | 6/2006 | Hinata et al. | ................... 349/96 |
| 7,058,252 | B2 * | 6/2006 | Woodgate et al. | ............. 385/16 |
| 7,186,015 | B2 * | 3/2007 | Kimmet et al. | ............. 362/630 |
| 7,268,841 | B2 * | 9/2007 | Kasajima et al. | .............. 349/96 |
| 2007/0002422 | A1 * | 1/2007 | O'Shaughnessy | ........... 359/265 |
| 2009/0213568 | A1 * | 8/2009 | Karman et al. | ............. 362/97.1 |

* cited by examiner

*Primary Examiner*—Scott J Sugarman
*Assistant Examiner*—Tuyen Q Tra
(74) *Attorney, Agent, or Firm*—H.C. Park & Associates, PLC

(57) ABSTRACT

Portable electronic devices with displays having switchable mirrors are described. The switchable mirror covers the display and is capable of switching from a transparent state to a reflecting state responsive to a switch in the portable electronic device. In one embodiment of the present invention, the display is switched off when the switchable mirror switches to its reflecting state. In another embodiment of the present invention, the switchable mirror is switched to its reflecting state when the portable electronic device is switched off.

14 Claims, 2 Drawing Sheets

PORTABLE ELECTRONIC DEVICE WITH AN INTEGRATED SWITCHABLE MIRROR

BACKGROUND OF THE INVENTION

The present invention is related to switchable mirrors and their integration into portable electronic devices, such as cellular telephones, sometimes called cell or mobile phones, personal digital assistants (PDAs), personal music/video players, such as MP3 players and IPods, and the like. Switchable mirrors might also be integrated into larger electronic devices, such as laptop computers.

Such portable and in most cases, handheld, electronic devices are becoming more and more common in modern society as their ease of use and functionalities increase. For example, some current cell phones, while no larger than one's palm, operate more like pocket-size computers. Besides voice communications, other functions of such telephones include the ability to send and receive e-mail, to "surf the Web" (i.e., to access the WorldWide Web), to manage schedules with personal calendars, to take and send digital photographs, to act as a platform for games, and other activities. Future projected functions of portable electronic devices include the wireless reception of television and music signals, the so-called mobile media. Of course, the merger of functions often blurs the terminology of a particular device. Whether a combination of cellular telephone and a personal digital assistant is called a cellular telephone with PDA features or a PDA with cell phone features is often a reflection of marketing rather than a weighing of device functions.

The miniaturization of portable electronic devices and their increased functionalities have furthermore allowed the introduction into consumer society of devices which were never intended as such. For example, GPS (Global Positioning Satellite) devices were developed originally for the military, but as sizes and costs declined, such devices appeared in the outdoor recreation market. Today GPS features are found in a myriad of handheld devices, such as cell phones, to guide the user to selected locations, such as a desired restaurant.

Nearly of all of these devices have a flat screen display by which the state or operation of the device is communicated to the viewer. The present invention uses the flat screen display to add another function to the device, albeit a simple, but useful one.

SUMMARY OF THE INVENTION

The present invention provides for a portable electronic device which has a housing sized to be held in a person's hand; a display mounted in the housing, the display showing the state or operation of the portable electronic device; and a switchable mirror covering the display and capable of switching from a transparent state to a reflecting state responsive to a switch in the portable electronic device. In one embodiment of the present invention, the display is switched off when the switchable mirror switches to its reflecting state. In another embodiment of the present invention, the switchable mirror is switched to its reflecting state when the portable electronic device is switched off. The portable electronic device can be a cellular telephone, a PDA, a music player, and even a GPS device. The present invention can also provide for a larger portable electronic device, such as a laptop computer, with a switchable mirror covering the display of the laptop computer and capable of switching from a transparent state to a reflecting state.

DESCRIPTION OF SPECIFIC EMBODIMENTS

As stated above, portable electronic devices employing a flat screen display, typically a liquid crystal display, or LCD, have become ubiquitous. Indeed, to conduct many businesses, a laptop computer and a cellular telephone have become necessities. By integrating an electrically controlled switchable mirror with the flat-screen display of a portable electronic device, the portable electronic device provides the user with a convenient and inconspicuous on-demand mirror. The user of such a device can check his or her appearance after using a cellular telephone, for example, without carrying a separate mirror. For normal operations of the device, the mirror switches to its transparent state so that the display is visible.

There are different switchable mirror technologies which have been recently developed. Early practical switchable mirror are based on hydrogen-induced phase transition in rare earth metals. Subsequently significant progress toward lower-cost, greater reliability and improved performance switchable mirrors has been made by transition metal-based switchable mirrors, or TMSM. Thin films of an active transition metal material, bonded to glass substrates, can switch reversibly between reflecting and transparent states, either by exposure to hydrogen or by application of an electric current. The TMSM film is laminated between electrodes with other electrolytes. In many cases, the active film can also be one of electrodes. These types of devices are also known as electrochromic devices.

Another development in switchable mirrors is based on lithium ion insertion that is even more stable and potentially lower cost than TMSM. As such, large-scale application, such as building windows, of this technology is now being contemplated. Of course, the present invention uses switchable mirrors configured to switch electrically on a far smaller scale.

Figure 1:
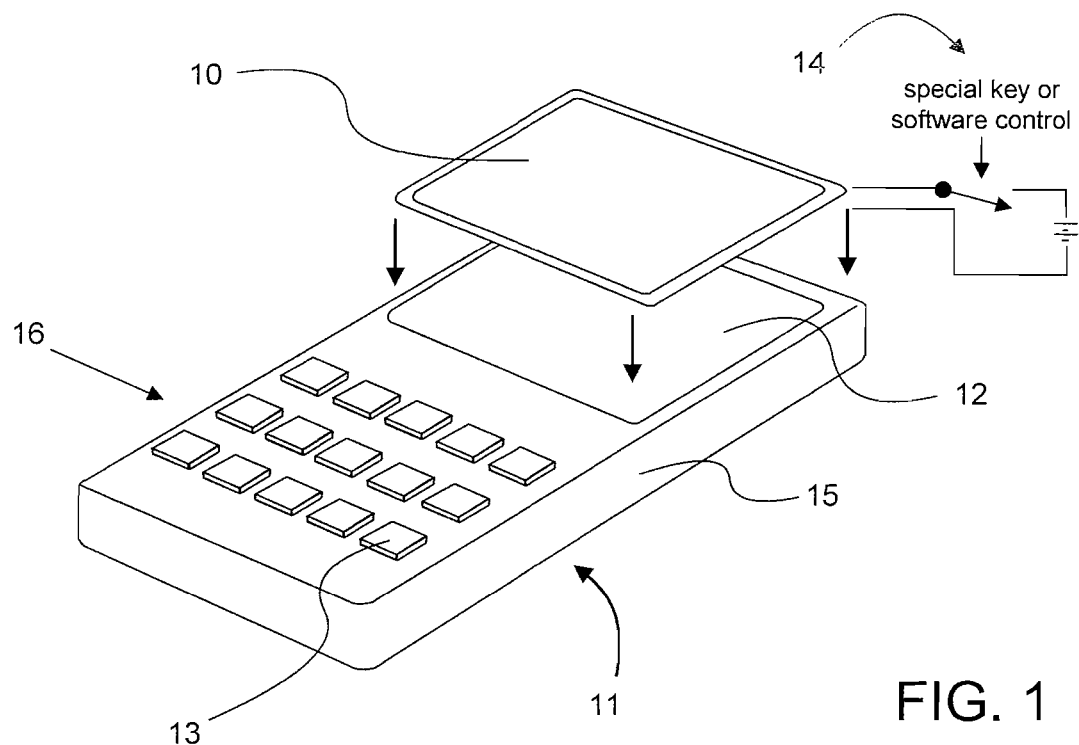
FIG. 1 is a representation of a portable electronic device with a switchable mirror, according to one embodiment of the present invention.

In one embodiment of the present invention, a switchable mirror 10 is attached to the surface of an LCD 12 which is mounted on the palm-sized housing 15 of a representative portable electronic device 11 illustrated in FIG. 1. The housing 15 also holds a keypad 16. The area of the switchable mirror 10 is equal to the area of the display 12 so that the mirror 10 fits over the LCD 12. The power source of the portable electronic device 11, which may be either a battery or a source external to the device 10, also provides power to the switchable mirror 10. An electronic switch represented by the switch 14, commanded by either a dedicated key 13 of the keypad 16 or device software turns the power on or off to the switchable mirror 10 to change its optical property from a (mostly) transparent state to a (mostly) reflecting state. When the switchable mirror 10 is in its transparent state, the underlying display is visible and the portable electronic device 11 functions normally. When the switchable mirror 10 is in its reflecting state, the underlying display can be powered off and the portable electronic device 11 functions as a mirror.

Figure 2:
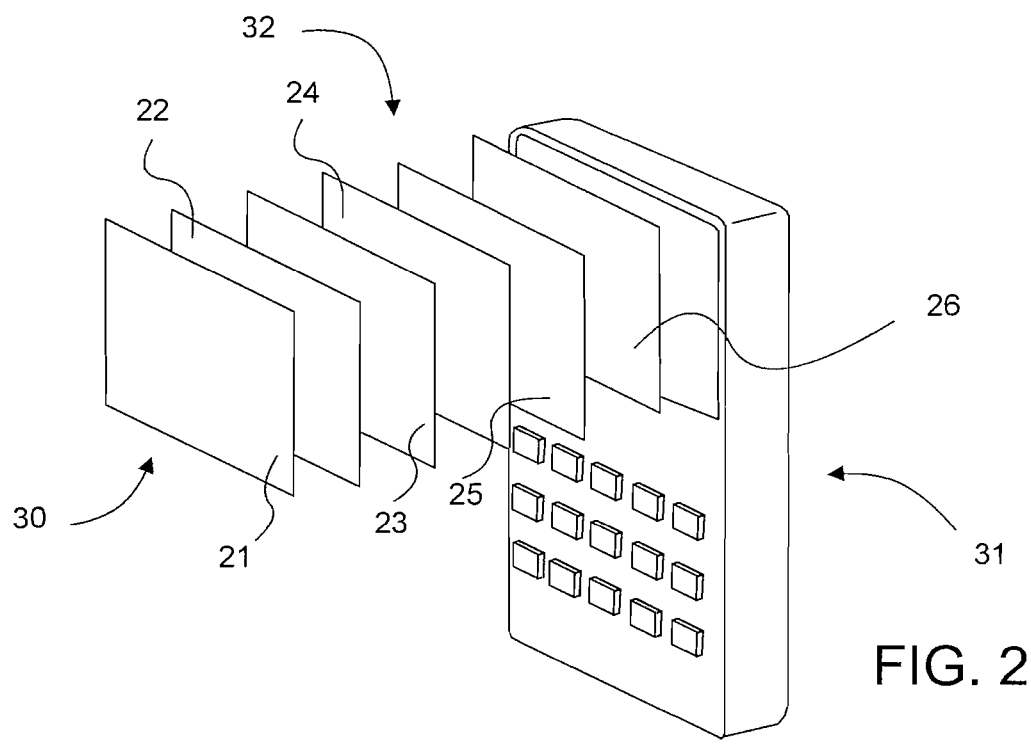
FIG. 2 is an exploded detailed view of the elements of a flat screen display with switchable mirror, according to one embodiment of the present invention.

Weight savings can be achieved if the top glass sheet of an LCD 31 is shared with a switchable mirror 30, such as shown in FIG. 2. It should be noted that the following description is not intended as a complete description of the construction of LCDs, but rather how a switchable mirror can be integrated into an LCD. In this embodiment of the present invention, the LCD 32 of the portable electronic device 31 is formed by a glass sheet 26 upon which is deposited a first set of LCD electrodes, such as a defined layer of indium-tin oxide (ITO) and a polarizing filter sheet; liquid crystal material 25; and a glass sheet 24 with a second set of LCD electrodes (and a set of thin film transistors). Insulating elastic bushings (not shown) around the edges of the glass sheets 24 and 26 separate the glass sheets and confine the liquid crystal material 25 between them. A polarizing filter sheet 21 completes the LCD.

The elements of the switchable mirror 30 are arranged between the polarizing filter sheet 21 and the glass sheet 24. Upon the inner surface (the side facing the display) of the sheet 22 is deposited a layer of electrochromic film and the mirror electrodes. An electrolyte layer 23 is placed against the electrochromic film. The counter electrode for the switchable mirror is deposited on the outer surface of the glass sheet 24. For a description of the construction of switchable mirrors and their materials, see U.S. Pat. No. 6,647,166.

The switch (not shown in FIG. 2) for the switchable mirror 30 is activated via a dedicated key, such as key 13 in FIG. 1, or by a combination of keystrokes on the key pad of the portable electronic device 31. The optical property of the switchable mirror changes between a transparent state and a reflecting state. When the switchable mirror is in its reflecting state, the display of the device is turned off since the display can no longer be seen. Power is saved. Furthermore, it may desirable that when the portable electronic device itself is turned off, the switchable mirror be in its reflecting state. This is achieved by the appropriate selection of the electrochromic material, such as a Ni—Mg alloy, and the operation of the mirror switch when the device is turned off. That is, the electrochromic material is in its reflecting state when there is no voltage applied to it. This feature is particularly useful for outdoor recreation devices, such as GPS devices. Even if the device is dead, the reflecting mirror serves as a useful signaling device to search parties, for example.

Figure 3:
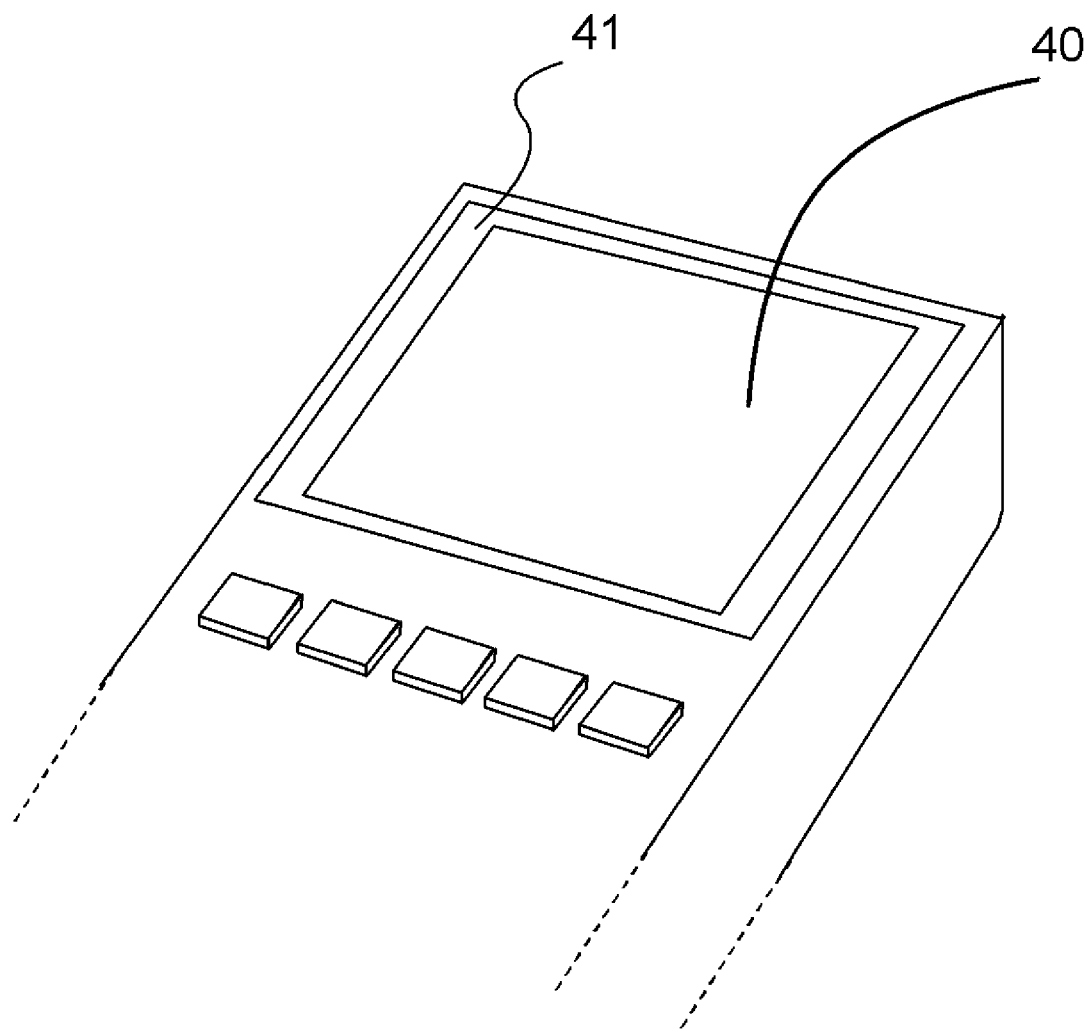
FIG. 3 is detailed view of switchable mirror covering a flat screen display partially, according to another embodiment of the present invention.

The switchable mirror has been described as covering the entire surface of the underlying display of the portable electronic device. Alternatively, the mirror can extend partially over the display surface. FIG. 3 shows such an arrangement. In this example, the switchable mirror 40 covers the center of the display surface so that a marginal portion 41 of the display surface extends around the mirror 40. Nearly all LCDs are backlit by fluorescent bulbs currently and by LEDs (Light-Emitting Diodes) in the near future to ensure a bright display. With the increasing luminescence of the backlighting, especially by LEDs, the display of the portable electronic device can provide a "lighted vanity mirror" when the switchable mirror 40 is switched to its reflecting state.

Furthermore, it has been assumed that the switchable mirror is flat. If the mirror is concave by having the switchable mirror including a concave surface facing away from the display, the switchable mirror in its reflecting state is a magnifier allowing the viewer to better see his or her reflection. Such mirrors allow not only detailed reflections of the viewer for vanity purposes, but are also useful for medical or hygienic purposes. Contact lens users can better see their eyes to insert their lenses or to adjust lenses which have slipped from their proper locations in the eye.

Hence the present invention has many uses and can be adapted to many different portable electronic devices.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. An electronic device comprising:
   a housing sized so that said electronic device is portable;
   a display mounted in said housing, said display showing the state or operation of said portable electronic device;
   a switchable mirror covering said display and operable for switching from a transparent state to a reflecting state responsive to a switch in said portable electronic device; and
   a backlight behind said display,
   wherein said switchable mirror covers a center of said display with a margin of said display extending completely around said switchable mirror so that said backlight from said display margin can illuminate a viewer of said switchable mirror.

2. The electronic device of claim 1 wherein said housing is sized to be held in a person's hand.

3. The electronic device of claim 2 wherein said display is switched off when said switchable mirror switches to said reflecting state.

4. The electronic device of claim 2 wherein said switchable mirror is switched to said reflecting state when said portable electronic device is switched off.

5. The electronic device of claim 2 wherein said portable electronic device is selected from the group comprising cellular telephones, PDAs, music players, and GPS devices.

6. The electronic device system of claim 2 wherein said switchable mirror is flat.

7. The electronic device of claim 2 wherein said switchable mirror includes a concave surface facing away from said display.

8. The electronic device of claim 1 wherein said portable electronic device comprise a laptop computer.

9. The electronic device of claim 8 wherein said display is switched off when said switchable mirror switches to said reflecting state.

10. The electronic device of claim 8 wherein said switchable mirror is switched to said reflecting state when said portable electronic device is switched off.

11. The electronic device system of claim 8 wherein said switchable mirror is flat.

12. The electronic device of claim 8 wherein said switchable mirror includes a concave surface facing away from said display.

13. The electronic device of claim 8 wherein said backlight comprises light-emitting diodes.

14. The electronic device of claim 1 wherein said backlight comprises light-emitting diodes.

* * * * *